United States Patent Office 3,637,748
Patented Jan. 25, 1972

3,637,748
HETERYL-METHANE COMPOUNDS
Hubertus Psaar and Roderich Raue, Leverkusen, Germany, assignors to Farbenfabriken Bayer Aktiengesellschaft, Leverkusen, Germany
No Drawing. Filed Apr. 5, 1968, Ser. No. 719,222
Claims priority, application Germany, Apr. 14, 1967, F 52,123
Int. Cl. C07d 27/56
U.S. Cl. 260—326.15
7 Claims

ABSTRACT OF THE DISCLOSURE

A heteryl methane compound of the formula

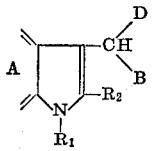

wherein $R_1$ and $R_2$ stand for members selected from the class consisting of hydrogen, lower alkyl, cycloalkyl, aralkyl and aryl, A stands for the residual part of an aromatic ring system, B stands for a carbocyclic or heterocyclic ring system being linked with the CH group via a cyclic carbon atom of said carbocyclic or heterocyclic ring system, D stands for a carbocyclic or heterocyclic ring system being linked with the CH group via a cyclic carbon atom of said carboxylic or heterocyclic ring system, said heteryl methane compound being free of sulphonic acid groups and are valuable dyestuff intermediates.

---

It has been found that sulphonic acid group-free heteryl-methane compounds of the general Formula I

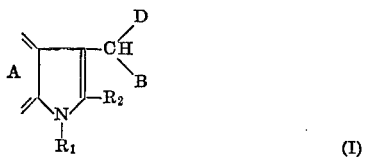

are obtained by condensing, preferably in an acidic medium, sulphonic acid group-free heteryl-methane compounds of the general Formula II

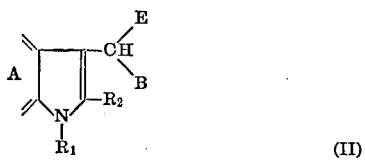

with carbocyclic or heterocyclic compound which carry a reactive hydrogen atom ("H-active components"), attached to a cyclic carbon atom, preferably with a compound of the aminobenzene, aminonaphthalene, hydroxynaphthalene or pyrazole series.

In the general Formulae I and II, $R_1$ and $R_2$ denote, independently of one another, hydrogen, or alkyl, cycloalkyl, aralkyl or aryl radicals, A represents the radical of an aromatic ring system which may also carry substituents, B denotes a carbocyclic or heterocyclic ring system which is linked with the CH group via a cyclic carbon atom, whereby the rings may be further substituted, D is a carbocyclic or heterocyclic ring system the rings of which may also be substituted, preferably a radical of the aminobenzene, aminonaphthalene, hydroxynaphthalene or pyrazole series which is linked with the CH group via a cyclic carbon atom; E denotes a radical capable of being split off, e.g. a hydroxy, alkoxy, aryloxy or amino group, a substituted amino group, such as an alkylamino or arylamino or piperidino group, a halogen substituent, such as Cl or Br, or a thiol or alkylthio group. The substituents in the various radicals may be the groups customary in tri- or diarylmethane compounds, with the exception of sulphonic acid groups.

Hydroxy-, alkoxy- and piperidino-indolyl-methane are obtained in known manner by the reaction of indoles with aromatic or heterocyclic aldehydes in the presence of alcohols or piperidine. The arylamino - indolyl - methanes which are linked with the CH group via N—, are obtained by the reaction of anilines or aromatic or heterocyclic aldehydes with indoles in a weakly acidic medium.

The condensation of the sulphonic acid group-free heteryl-methane compounds of the Formula II with H-active components to give the heteryl-methane compounds of the Formula I is effected by heating with acid condensing agents, such as acetic acid, acetic anhydride, zinc chloride, or with mixtures of various acid condensing agents. Inorganic acid chlorides, such as phosphorus oxychloride or thionylchloride are also suitable as condensing agents, the use of a solvent, such as chloroform, benzene, toluene, chlorobenzene or dichlorobenzene, being expedient.

Suitable suphonic acid group-free heteryl-methane compounds of the Formula II are, for example, 2-methylindolyl-(3)-phenyl-ethoxy-methane,
2-methylindolyl-(3)-(4'-nitrophenyl)-ethoxy-methane,
2-methylindolyl-(3)-(4'-chlorophenyl)-ethoxy-methane,
2-methylindolyl-(3)-(4'-methoxyphenyl)ethoxy-methane,
2-methylindolyl-(3)-(4'-methylphenyl)-ethoxy-methane,
2-methylindolyl-(3)-phenyl-methoxy-methane,
2-methylindolyl-(3)-furyl-(2)-ethoxy-methane,
2-methylindolyl-(3)-thiophenyl-(2)-ethoxy-methane,
2-methylindolyl-(3)-(2'-hydroxyphenyl)-N-piperidino-methane,
2-methylindolyl-(3)-(2'-nitrophenyl)-hydroxy-methane,
1-methyl-2-phenylindolyl-(3)-phenyl-N-anilino-methane,
1-methyl-2-phenylindolyl-(3)-(2-chlorophenyl)-N-anilino-methane,
1-methyl-2-phenylindolyl-(3)-(4'-chlorophenyl)-N-anilino-methane,
1-methyl-2-phenylindolyl-(3)-(4'-methylphenyl)-N-anilino-methane,
1-methyl-2-phenylindolyl-(3)-(4'-methoxy-phenyl)-N-anilino-methane,
1-methyl-2-phenylindolyl-(3)-(3'-nitrophenyl)-N-anilino-methane,
1-methyl-2-phenylindolyl-(3)-thiophenyl-(2)-N-anilino-methane,
indolyl-(3)-phenyl-ethoxy-methane.

Sulphonic acid group-free H-active components within the scope of the invention are, for example, methylaniline,
ethylaniline,
hydroxy ethylaniline,
butylaniline,
dimethylaniline,
diethylaniline,
methylhydroxyethylaniline, methylchloroethylaniline,
methylcyanoethylaniline,
ethylhydroxyethylaniline,
dihydroxyethylaniline,
hydroxyethyl-cyanoethylaniline,
chloroethyl-cyanoethylaniline,
dimethyl-m-toluidine,
dihydroxyethyl-m-toluidine,
methylchloroethyl-m-toluidine,
methylcyanoethyl-m-toluidine,
3-chlorodimethylaniline,
3-chlorodihydroxy-ethylaniline,
3-chlorodiethylaniline,
3-hydroxydiethylaniline,
3-ethoxy-diethylaniline,
tetrahydroquinoline,
1,2,3,3-tetramethyl-dihydroindole,
N-phenyl-piperidine,
N-phenylmorpholine,
diphenylamine,
N-methyldiphenylamine,
p-ethoxy-N-methyldiphenylamine,
diethylnaphthylamine-(1),
4-ethoxy-phenylnaphthylamine-(1),
naphthol-(1),
2-methylindole,
1-methyl-2-phenylindole,
1,2-dimethylindole,
4-methylquinoline-methosulphate,
1-phenyl-3-methylpyrazoline-(5),
1-phenyl-2,3-dimethylpyrazolone (5),
ethyl-cyanoethyl-m-toluidine,
cyanoethyl-o-toluidine,
ethyl-β-dimethylaminoethyl-m-toluidine,
N-ethyl-naphthylamine-(1).

The sulphonic acid group-free heteryl-methyl-methane compounds of the general Formula I are intermediates for the production of dyestuffs. They can be converted into dyestuffs by the dehydrogenating or oxidising agents customary in the triphenyl-methane chemistry, such as e.g. iron(III) and copper(II) salts, the complex compounds thereof, alkali metal dichromates, lead(IV) oxide and its salts, e.g. lead tetraacetate, nitrous acid, peroxide compounds, such as potassium persulphate, hydrogen peroxide as well as atmospheric oxygen, optionally with the addition of oxygen-carrying catalysts, such as metal ions.

The parts in the following examples are parts by weight.

EXAMPLE 1

20.7 parts 1-methyl-2-phenylindole and 18.1 parts benzilidene-anile are dissolved in 100 parts dimethyl formamide and 80 parts glacial acetic acid. The mixture is stirred at 20 to 30° C. for 20 hours, then filtered and the filtrate is poured into 1000 parts water, while stirring. The precipitate is filtered off with suction and dried at 50° C. in a vacuum. After recrystallisation from alcohol, the product has a melting point of 173 to 176° C. It has the probable formula (a)

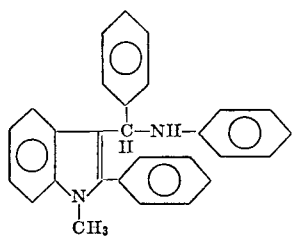

⬡ stands for ⬡

The following table contains further components which are prepared from the corresponding starting components according to the method of operation analogous to that given above:

| | | M.P. (° C.) |
|---|---|---|
| (b) | | 152–154 |
| (c) | | 84–87 |
| (d) | | 140–142 |
| (e) | | 165–168 |
| (f) | | 177–179 |
| (g) | | 207–209 |

39 parts 1-methyl-2-phenylindolyl-(3)-phenyl-anilinomethane [Formula a], 10.7 parts methylaniline (as H-active components), 150 parts 96% alcohol and 20 parts zinc chloride are boiled under reflux for 2 hours. The mixture is cooled to room temperature and the precipitated crystals are filtered off with suction. The resultant product is recrystallised from dimethyl formamide and alcohol. It has the probable formula

| | | M.P. (° C.) |
|---|---|---|
| (h) | [structure] | 182–184 |

With the use of 1-phenyl-3-methyl-pyrazolone-(5) as H-active component, a product of the probable formula

| | | M.P (° C) |
|---|---|---|
| (i) | [structure] | 209–213 | is obtained.

EXAMPLE 2

5.1 parts 2-methylindolyl-(1,3)-phenyl-ethoxymethane and 2.5 parts dimethylaniline are boiled under reflux for 30 minutes in 50 parts glacial acetic acid and 10 parts acetic anhydride. The mixture is poured, while stirring, into 400 parts water; the precipitate is filtered off with suction, dried at 50° C. in a vacuum, and recrystallised from alcohol. The product has the probable formula

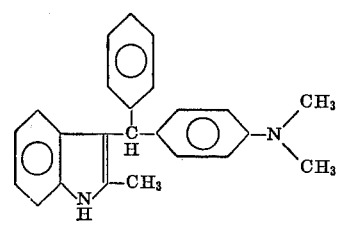

M.P. 176–178° C.

In an analogous manner there are obtained with the use of 2-methylindolyl-(3)-phenyl-ethoxymethane the corresponding indolylmethanes with the following components:

| H-active component | Indolylmethane | M.P. (° C.) |
|---|---|---|
| N-methyldiphenylamine | [structure] | Resin |
| 1-phenyl-2,3-dimethylpyrazolone(5) | [structure] | 195–197 |
| 1-phenyl-3-methylpyrazolone(5) | [structure] | 201–203 |

EXAMPLE 3

28 parts 2-methylindolyl-(3)-(2'-nitrophenyl)-hydroxy-methane, 15 parts diethylaniline, 100 parts glacial acetic acid and 20 parts acetic anhydride are heated at 100° C. for one hour, while stirring. The mixture is poured, while stirring, into 400 parts water. The precipitate is filtered off with suction and dried at 50° C. in a vacuum. After recrystallisation from alcohol, the product has a melting point of 146 to 148° C. (yellow needles). It has the probable formula

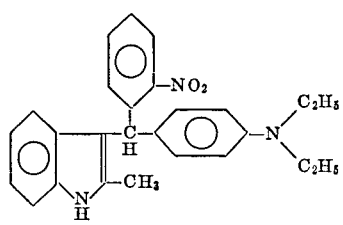

EXAMPLE 4

32 parts 2-methylindolyl-(3)-(2'-hydroxyphenyl)-piperidinomethane and 15 parts diethylaniline are reacted in accordance with Example 3. An indolylmethane of the probable formula

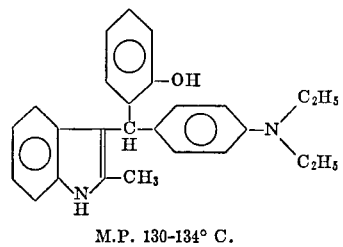

M.P. 130-134° C.

is obtained.

EXAMPLE 5

26 parts 2-methylindole and 22.5 parts thiophene-2-aldehyde are stirred at 20 to 30° C. for 24 hours in 100 parts 96% ethyl alcohol and 20 parts of a 10% sodium hydroxide solution. Water is added until crystallisation begins, and the precipitate is filtered off with suction after a further 10 hours. The product is recrystallised from alcohol. It has the probable formula

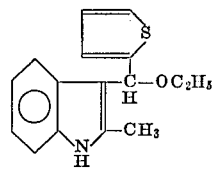

M.P. 127-128° C.

24 parts of this 2-methylindolyl-(3)-thiophenylethoxymethane are reacted with 13.3 parts diethylaniline as described in Example 3. An indolylmethane of the probable formula

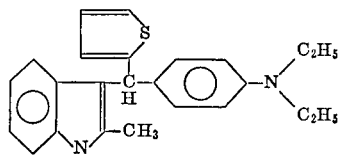

M.P. 174-176° C.

is obtained.

EXAMPLE 6

39 parts 1-methyl-2-phenylindolyl-(3)-phenyl-anilinomethane, 15 parts dimethylaniline, 100 parts glacial acetic acid, 20 parts acetic anhydride and 10 parts zinc chloride are boiled under reflux for 2 hours. The mixture is cooled to room temperature, the precipitate filtered off with suction and recrystallised from dimethyl formamide and alcohol. The compound has the probable formula

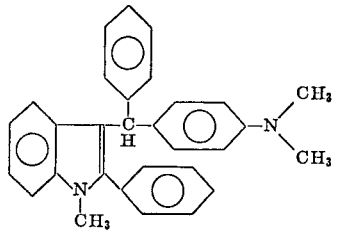

M.P. 187-189° C

In an analogous manner there are obtained with the use of 1-methyl-2-phenyl-indolyl-(3)-phenyl-anilinomethane the corresponding indolylmethanes with the following components:

| H-active component | Indole methane | M.P. (° C.) |
|---|---|---|
| Dihydroxyethyl-m-toluidine | (structure shown) | 174-176 |
| 3-ethoxydiethylaniline | (structure shown) | 196-198 |

| H-active component | Indole methane | M.P. (°C.) |
|---|---|---|
| 3-chlorodiethylaniline | | 202–204 |
| 1-phenyl-2,3-dimethyl-pyrazolone(5) | | 133–136 |

In an analogous manner there is obtained from 22 parts 1-methyl - 2 - phenyl-indolyl-(3)-(3'-nitrophenyl)-anilino-methane and 7.5 parts diethylaniline an indolylmethane of the probable formula

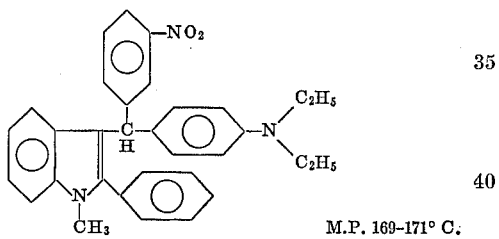

M.P. 169–171° C.

In an analogous manner there are obtained with the use of appropriate starting compounds the following indolylmethanes:

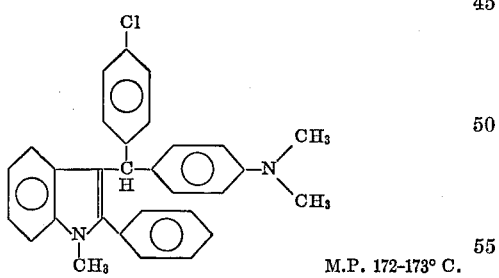

M.P. 172–173° C.

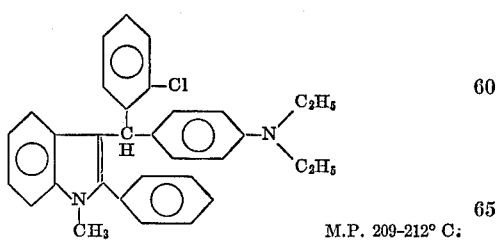

M.P. 209–212° C.

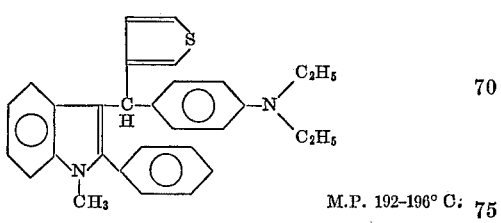

M.P. 192–196° C.

EXAMPLE 7

26.5 parts of 2-methylindoyl-(3)-phenylethoxymethane and 20.7 parts of N-ethyl-naphthylamine-(1)-hydrochloride are stirred in 70 parts of glacial acetic acid for 3 hours at 20 to 30° C. The precipitate is filtered off with suction, washed with 50 parts of alcohol and dried at 50° C. in a vacuum. The product has the probable formula

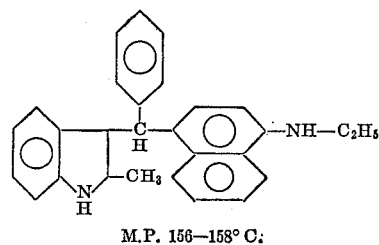

M.P. 156—158° C.

In an analogous manner there are obtained with the use of appropriate starting compounds the following indolylmethanes:

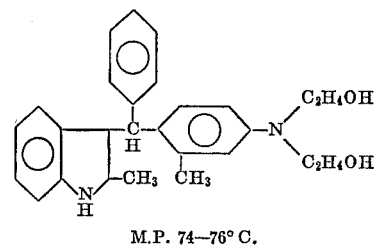

M.P. 74—76° C.

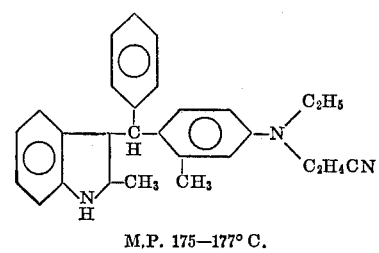

M.P. 175—177° C.

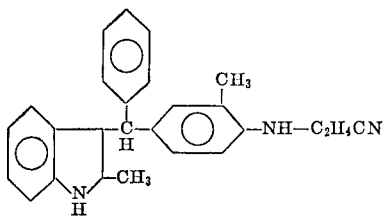

M.P. 152–54° C.

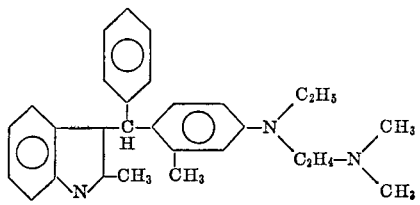

M.P. 140–142° C.

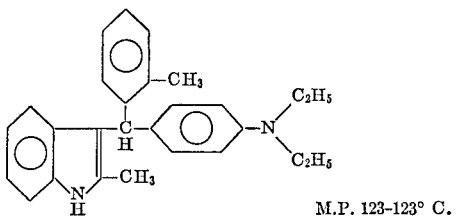

M.P. 123–123° C.

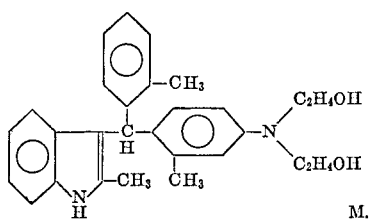

M.P. 88–90° C.

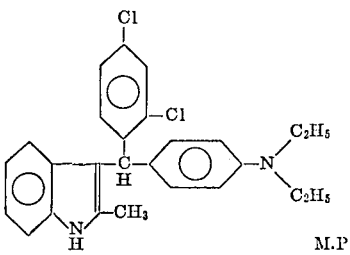

M.P. 253–255° C.

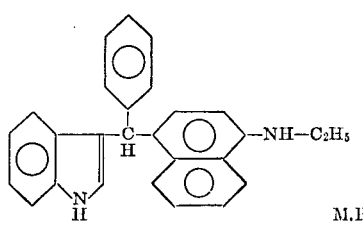

M.P. 195–197° C.

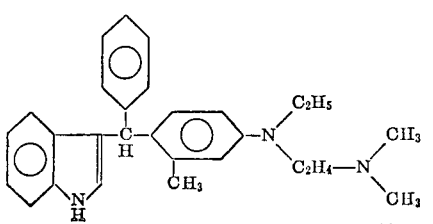

M.P. 167–169° C.

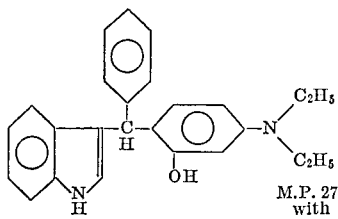

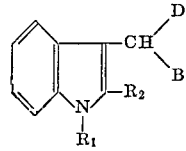

M.P. 276–278° C. with decomposition

We claim:
1. A heteryl methane compound which is free of sulphonic acid groups and has the formula wherein $R_1$ is hydrogen or methyl $R_2$ is methyl or phenyl

B stands for a member selected from the group consisting of phenyl, nitrophenyl, chlorophenyl, dichlorophenyl, methoxyphenyl, methylphenyl, hydroxyphenyl, thienyl-2, and furyl-2

D stands for a member selected from the group consisting of 4-methylquinolinyl-methosulphate, 1,2,3,3-tetramethyl - dihydroindolyl, 1-phenyl - 3-methyl-pyrazolone-(5)-yl, 1-phenyl-2,3 - dimethyl-pyrazolone-(5)-yl, substituted naphthyl, substituted phenyl, substituted chlorophenyl, substituted methylphenyl, substituted hydroxyphenyl and substituted ethoxyphenyl, wherein the substituent is located in the 4-position relative to the position at which the CH-group is bound and is a member selected from the group consisting of phenylamino, ethoxyphenyl, amino, methyl-phenyl-amino, methylethoxyphenyl-amino, piperidino, morpholino, mono-alkylamino wherein the alkyl portion contains 1–4 carbon atoms, di-lower alkylamino wherein the lower alkyl portion contains 1–2 carbon atoms, and said mono-alkylamino and said di-lower alkylamino substituted by a member of the group consisting of hydroxy, chloro, cayno, and dimethylamino.

2. The heteryl methane compounds of claim 1 wherein

B stands for a member selected from the group consisting of phenyl, nitrophenyl, chlorophenyl, dichlorophenyl, methoxyphenyl, methylphenyl and hydroxyphenyl; and D stands for a substituted radical wherein the radical is selected from the group consisting of phenyl, chlorophenyl, methylphenyl, hydroxyphenyl and ethoxyphenyl, and the substituent is located in the 4-position relative to the position at which the CH group is bound and is a member selected from the group consisting of mono-alkylamino wherein the alkyl portion contains 1–4 carbon atoms, di-lower alkylamino wherein the lower alkyl portion contains 1–2 carbon atoms, and said mono-alkylamino and said di-lower alkyl amino substituted by a member selected from the group consisting of hydroxy, chloro, cyano, and dimethylamino.

3. The heteryl methane compound according to claim 1 of the formula

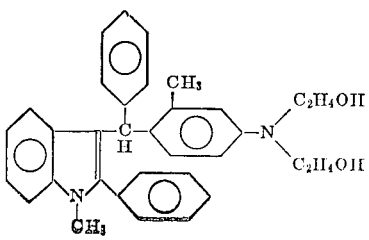

4. The heteryl methane compound according to claim 1 of the formula

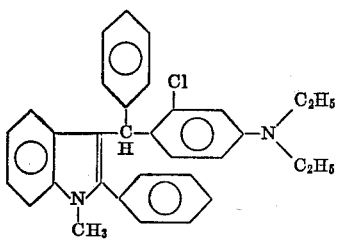

5. The heteryl methane compound according to claim 1 of the formula

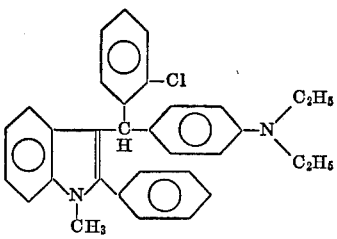

6. The heteryl methane compound according to claim 1 of the formula

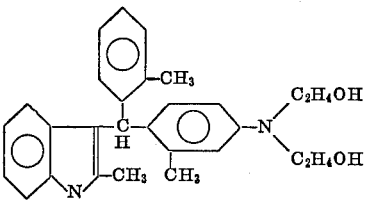

7. The heteryl methane compound according to claim 1 of the formula

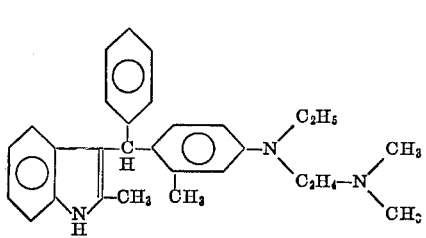

References Cited
UNITED STATES PATENTS
3,420,838   1/1969   Szmuszkovicz _____ 260—294.7

ALEX MAZEL, Primary Examiner
J. A. NARCAVAGE, Assistant Examiner

U.S. Cl. X.R.

260—247.5 B, 288 R, 293 D, 310 A, 326.11, 326.12 R